US008806421B1

(12) United States Patent
Wei et al.

(10) Patent No.: US 8,806,421 B1
(45) Date of Patent: Aug. 12, 2014

(54) SYSTEM AND METHOD FOR DESIGNING VIA OF PRINTED CIRCUIT BOARD

(71) Applicants: Hong Fu Jin Precision Industry (ShenZhen) Co., Ltd., Shenzhen (CN); Hon Hai Precision Industry Co., Ltd., New Taipei (TW)

(72) Inventors: Ming Wei, Shenzhen (CN); Chia-Nan Pai, New Taipei (TW); Shou-Kuo Hsu, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/967,349

(22) Filed: Aug. 15, 2013

(30) Foreign Application Priority Data

Jan. 19, 2013 (CN) .......................... 2013 1 00197689

(51) Int. Cl.
*G06F 17/50* (2006.01)
(52) U.S. Cl.
USPC ........................................................ 716/137
(58) Field of Classification Search
USPC .................. 716/135, 137; 174/258, 266, 377
See application file for complete search history.

(56) References Cited

U.S. PATENT DOCUMENTS

| 7,249,337 | B2 * | 7/2007 | Gisin et al. ..................... 716/115 |
| 7,409,667 | B1 * | 8/2008 | Pritchard et al. ............... 716/102 |
| 2007/0074905 | A1 * | 4/2007 | Lin et al. ........................ 174/263 |
| 2008/0093112 | A1 * | 4/2008 | Kushta ........................... 174/260 |
| 2010/0314163 | A1 * | 12/2010 | Twardy et al. ................. 174/266 |

\* cited by examiner

*Primary Examiner* — Thuan Do
*Assistant Examiner* — Brian Ngo
(74) *Attorney, Agent, or Firm* — Novak Druce Connolly Bove + Quigg LLP

(57) ABSTRACT

A via design method includes doing a simulation according to input data to obtain the impedance of the via of the reference printed circuit board (PCB). An optimal via model is determined according to a group of input data. Simulating is performed according to the thickness of a PCB to-be-designed and the optimal via model data, to obtain the impedance of a via of a PCB to be designed. The number of the anti-pads of the via of the PCB to be designed is recorded when the difference between the impedance of the via of the PCB to be designed and the impedance of the via model of the reference PCB does not fall within a preset range. An interval between each two adjacent anti-pads of the via of the PCB to designed is determined according to the recorded number and the thickness of the PCB to be designed.

9 Claims, 3 Drawing Sheets

SYSTEM AND METHOD FOR DESIGNING VIA OF PRINTED CIRCUIT BOARD

BACKGROUND

1. Technical Field

The present disclosure relates to printed circuit board (PCB) technology, and particularly to a system and a method to design a via of a PCB.

2. Description of Related Art

A via includes a hole, a pad, and an anti-pad. When the thickness of a PCB increases, the length of a via of the PCB correspondingly increases. When the length of a via increases, the inductance of the via increases, accordingly, the impedance of the via increases. The impedance of the via can bring bad influence on signal transmission. Thus, when designing a via of a PCB, in simulation, the diameter of the hole, the pad, and the anti-pad of the via may needed to be frequently adjusted to obtain a via having optimal impedance. However, applying this method of adjustment to obtain an optimal via is often time consuming.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding portions throughout the several views.

DETAILED DESCRIPTION

Embodiments of the present disclosure are described in detail, with reference to the accompanying drawings.

Figure 1:
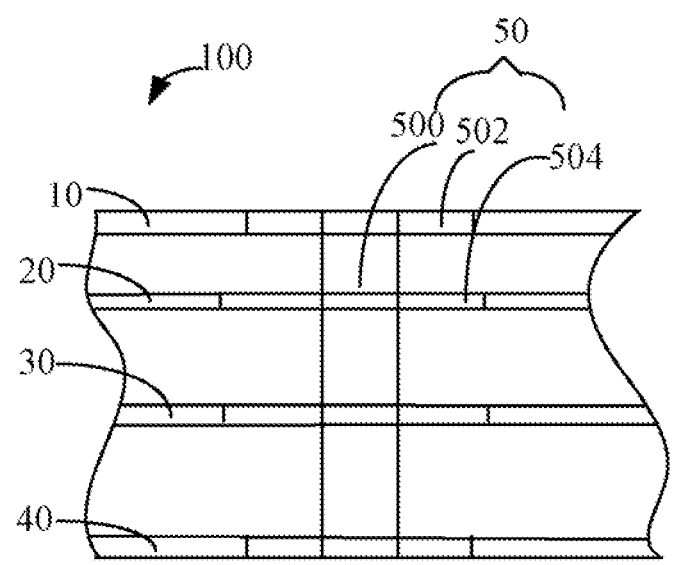
FIG. 1 is a schematic view of a known PCB.

Referring to FIG. 1, a PCB 100 with four layers includes a first signal layer 10, a power plane 20, a land 30, a second signal layer 40, and a via 50. The via 50 includes a hole 500, a pad 502, and an anti-pad 50. The length of the via 50 (through via) is equal to the thickness of the PCB 100. When the layers of the PCB 100 increases, the impedance of the via 50 increases. Actually, the impedance of the via 50 can be further affected by the number of the anti-pads 504 of the via 500. By simulation, it can be concluded that when the number of the anti-pads 504 of the via 500 increases, the impedance of the via 50 decreases. Therefore, designing a via with optimal impedance can be achieved by adjusting the number of the anti-pads of the via.

Figure 2:
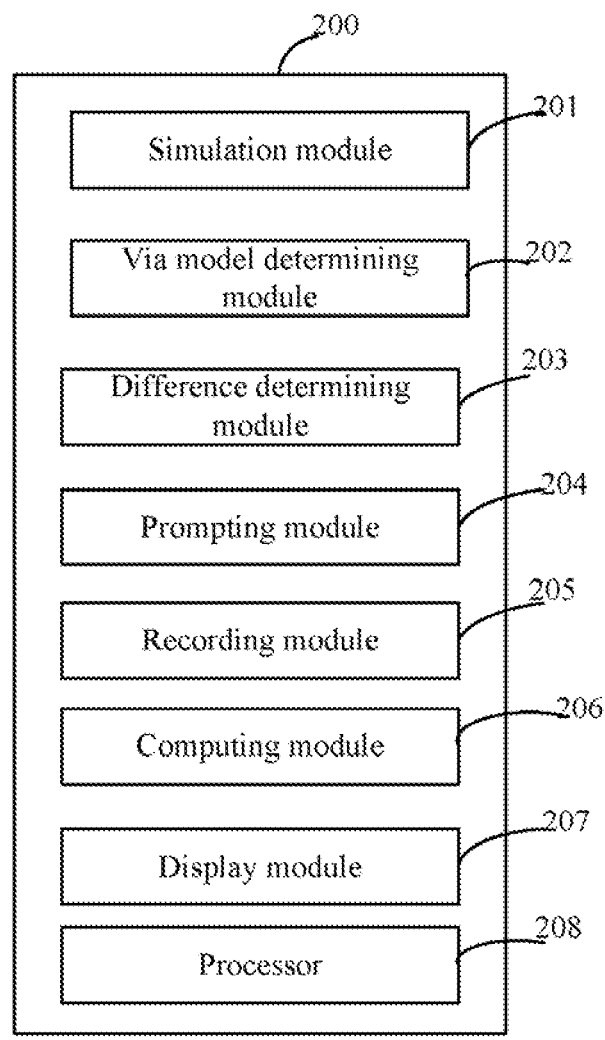
FIG. 2 is a block diagram of a design system for designing a via of a PCB, in accordance with an exemplary embodiment.

FIG. 2 is a design system 200 for designing a via of a PCB. The design system 200 includes a simulation module 201, a via model determining module 202, a difference determining module 203, a prompting module 204, a recording module 205, a computing module 206, a display module 207, and one or more processors 208 to execute the above-mentioned modules.

Figure 3:
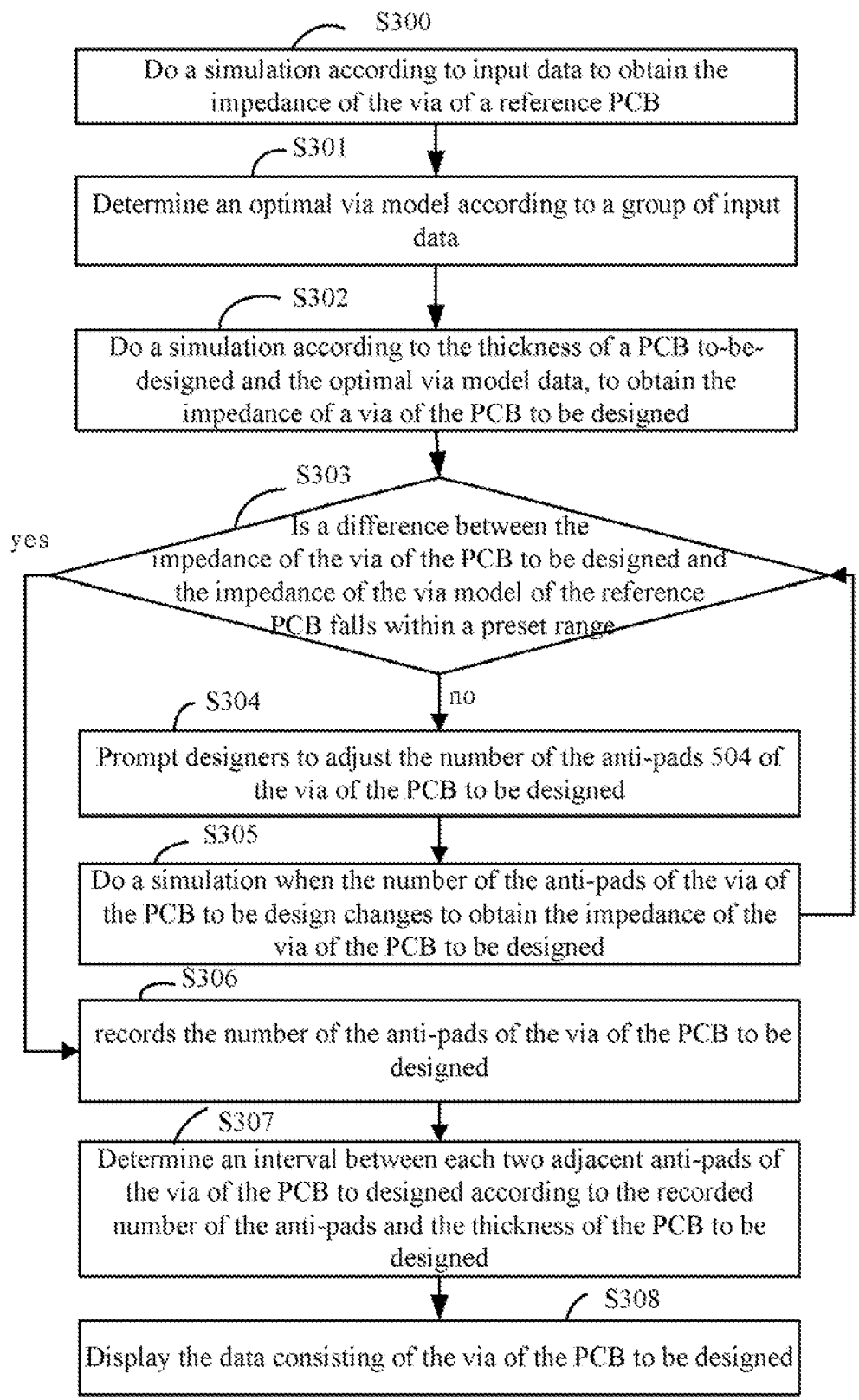
FIG. 3 is a flowchart of a design method for designing a via of a PCB, in accordance with an exemplary embodiment.

FIG. 3 is a flowchart of a design method for designing a via of a PCB in accordance with an exemplary embodiment.

In step S300, the simulation module 201 does a simulation according to input data to obtain the impedance of the via of the reference PCB. Each time when a group of data for calculating the impedance of the via is input, the simulation module 201 does a simulation according to the one group of input data to obtain one impedance of the via. In this embodiment, the reference PCB includes four or more layers. The reference PCB usually includes four or eight layers.

In step S301, the via model determining module 202 determines an optimal via model according to a group of input data, and the impedance of the via obtained according to the group of input data is optimized. The optimal via model data includes the diameter of the hole, the pad, and the anti-pad, and the number of the anti-pads.

In step S302, the simulation module 201 does the simulation according to the thickness of a PCB to-be-designed and the optimal via model data, to obtain the impedance of a via 50 of the PCB to be designed.

In step S303, the difference determining module 203 determines whether a difference between the impedance of the via of the PCB to be designed and the impedance of the via model of the reference PCB falls within a preset range. If no, step S304 is executed. Otherwise, step S306 is executed.

In step S304, the prompting module 204 prompts designers to adjust the number of the anti-pads 504 of the via of the PCB to be designed.

In step S305, the simulation module 201 does the simulation when the number of the anti-pads of the via of the PCB to be design changes, to obtain the impedance of the via of the PCB to be designed. After step S305 is executed, the procedure returns to step S303.

In step S306, the recording module 205 records the number of the anti-pads of the via of the PCB to be designed when the difference between the impedance of the via of the PCB to be designed and the impedance of the via model of the reference PCB falls within the preset range.

In step S307, the computing module 206 determines an interval between each two adjacent anti-pads of the via of the PCB to be designed according to the recorded number of the anti-pads and the thickness of the PCB to be designed.

In step S308, the display module 207 displays the data consisting of the via of the PCB to be designed, thus, the designers can determine how to design the via of the PCB to be designed. The data consisting of the via of the PCB to be designed includes the diameter of the hole, the pad, and the anti-pad of the via model, the recorded number of the anti-pads, and the interval between each two adjacent anti-pads of the via of the PCB to be designed.

With such configuration, the via model data can be used in designing a via for different PCBs with different layers. If the impedance of the via of one PCB designed with the via model data is not optimal, adjusting the number of the anti-pads of the via can cause the impedance of the via to reach optimized, without frequently adjusting the diameter of the hole, the pad, and the anti-pad.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A design system for designing a via of a printed circuit board (PCB), comprising:
   one or more processors; and
   a plurality of modules executed by the one or more processors to perform operations of designing a via of a PCB, the operations comprising:
   doing a simulation according to input data to obtain the impedance of the via of a reference PCB;

determining an optimal via model according to a group of input data, the impedance of the via of the reference PCB obtained according to the group of input data being optimal, the optimal via model data comprising the diameter of a hole, a pad, and an anti-pad of the optimal via model, and the number of the anti-pads of the optimal via model;

doing a simulation according to the thickness of a PCB to-be-designed and the optimal via model data, to obtain the impedance of a via of a PCB to be designed;

determining whether a difference between the impedance of the via of the PCB to be designed and the impedance of the via model of the reference PCB falls within a preset range;

prompting designers to adjust the number of the anti-pads of the via of the PCB to be designed when the difference between the impedance of the via of the PCB to be designed and the impedance of the via model of the reference PCB does not fall within the preset range;

doing a simulation when the number of the anti-pads of the via of the PCB to be designed changes to obtain the impedance of the via of the PCB to be designed recording the number of the anti-pads of the via of the PCB to be designed when the difference between the impedance of the via of the PCB to be designed and the impedance of the via model of the reference PCB falls within the preset range;

determining an interval between each two adjacent anti-pads of the via of the PCB to designed according to the recorded number of the anti-pads and the thickness of the PCB to be designed; and displaying the data consisting of the via of the PCB to be designed, the data comprising the diameter of a hole, a pad, and an anti-pad of the via model, the number of the anti-pads of the via of the PCB to be designed, and the interval between each two adjacent anti-pads of the via of the PCB to designed.

2. The system as described in claim 1, wherein the reference PCB comprises four layers.

3. The system as described in claim 1, wherein the reference PCB comprises eight layers.

4. A computer-implemented design method for designing a via of a printed circuit board (PCB), the computer-implemented design method being applied in a design system for designing a via of a printed circuit board, the design system comprising at least one processor, the computer-implemented design method comprising:

doing a simulation according to input data to obtain the impedance of the via of a reference PCB by the processor;

determining an optimal via model according to a group of input data, the impedance of the via of the reference obtained according to the group of input data being optimal, the optimal via model data comprising the diameter of a hole, a pad, and an anti-pad of the optimal via model, and the number of the anti-pads of the optimal via model by the processor;

doing a simulation according to the thickness of a PCB to be designed and the optimal via model data via model, to obtain the impedance of a via of a PCB to be designed by the processor;

determining whether a difference between the impedance of the via of the PCB to be designed and the impedance of the via model of the reference PCB falls within a preset range by the processor;

prompting designers to adjust the number of the anti-pads of the via of the PCB to be designed when the difference between the impedance of the via of the PCB to be designed and the impedance of the via model of the reference PCB does not fall within the preset range by the processor;

doing a simulation when the number of the anti-pads of the via of the PCB to be designed changes to obtain the impedance of the via of the PCB to be designed by the processor;

recording the number of the anti-pads of the via of the PCB to be designed when the difference between the impedance of the via of the PCB to be designed and the impedance of the via model of the reference PCB falls within the preset range by the processor;

determining an interval between each two adjacent anti-pads of the via of the PCB to designed according to the recorded number of the anti-pads and the thickness of the PCB to be designed by the processor; and displaying the data consisting of the via of the PCB to be designed, the data comprising the diameter of a hole, a pad, and an anti-pad of the via model, the number of the anti-pads of the via of the PCB to be designed, and the interval between each two adjacent anti-pads of the via of the PCB to designed by the processor.

5. The method as described in claim 4, wherein the reference PCB comprises four layers.

6. The method as described in claim 4, wherein the reference PCB comprises eight layers.

7. A non-transitory computer-readable storage medium encoded with a computer program, the program comprising instructions that when executed by one or more computers cause the one or more computers to perform operations comprising:

doing a simulation according to input data to obtain the impedance of the via of a reference PCB;

determining an optimal via model according to a group of input data, the impedance of the via of the reference obtained according to the group of input data being optimal, the optimal via model data comprising the diameter of a hole, a pad, and an anti-pad of the optimal via model, and the number of the anti-pads of the optimal via model;

doing a simulation according to the thickness of a PCB to be designed and the optimal via model data, to obtain the impedance of a via of a PCB to be designed;

determining whether a difference between the impedance of the via of the PCB to be designed and the impedance of the via model of the reference PCB falls within a preset range;

prompting designers to adjust the number of the anti-pads of the via of the PCB to be designed when the difference between the impedance of the via of the PCB to be designed and the impedance of the via model of the reference PCB does not fall within the preset range;

doing a simulation when the number of the anti-pads of the via of the PCB to be designed changes to obtain the impedance of the via of the PCB to be designed recording the number of the anti-pads of the via of the PCB to be designed when the difference between the impedance of the via of the PCB to be designed and the impedance of the via model of the reference PCB falls within the preset range;

determining an interval between each two adjacent anti-pads of the via of the PCB to designed according to the recorded number of the anti-pads and the thickness of the PCB to be designed; and displaying the data consisting of the via of the PCB to be designed, the data comprising the diameter of a hole, a pad, and an anti-pad of the via model, the number of the anti-pads of the via of the PCB to be designed, and the interval between each two adjacent anti-pads of the via of the PCB to designed.

8. The storage medium as described in claim 7, wherein the reference PCB comprises four layers.

9. The storage medium as described in claim 7, wherein the reference PCB comprises eight layers.

* * * * *